(No Model.)

W. W. HUNTLEY.
MACHINE FOR TESTING ROTATING PARTS.

No. 360,807. Patented Apr. 5, 1887.

Witnesses:
Theodore L. Popp
Geo. J. Buchheit Jr.

W. W. Huntley, Inventor
By Wilhelm Bonner,
Attorneys.

UNITED STATES PATENT OFFICE.

WILLIAM W. HUNTLEY, OF SILVER CREEK, NEW YORK, ASSIGNOR TO CRANSON, HUNTLEY & COMPANY, OF SAME PLACE.

MACHINE FOR TESTING ROTATING PARTS.

SPECIFICATION forming part of Letters Patent No. 360,807, dated April 5, 1887.

Application filed November 11, 1886. Serial No. 218,640. (No model.)

*To all whom it may concern:*

Be it known that I, WILLIAM W. HUNTLEY, of Silver Creek, in the county of Chautauqua and State of New York, have invented new and useful Improvements in Machines for Testing Rotating Parts, of which the following is a specification.

This invention relates to a machine for testing the rotating parts of machines with a view of determining whether said parts are properly balanced before they are attached to the machines in which they are used. For this purpose the testing-machine is provided with bearings in which the part to be tested is rotated, and which have yielding or elastic supports, which permit the bearings to move out of line when the rotating part is unbalanced, thereby indicating to the operator where and to what extent the part is unbalanced and enabling the operator to take proper steps to remedy the difficulty.

My invention consists of the improvement which will be hereinafter fully set forth, and pointed out in the claims.

Figure 1:
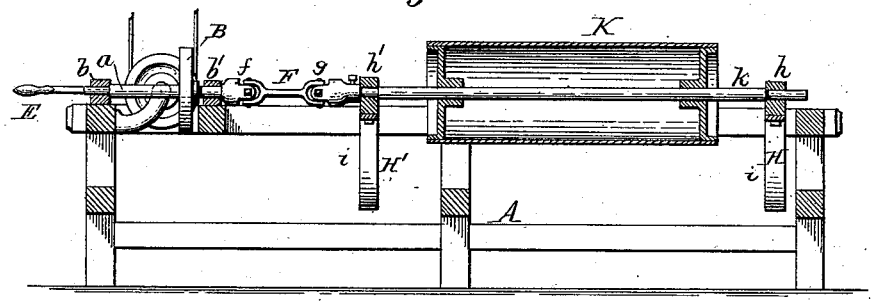
Figure 2:
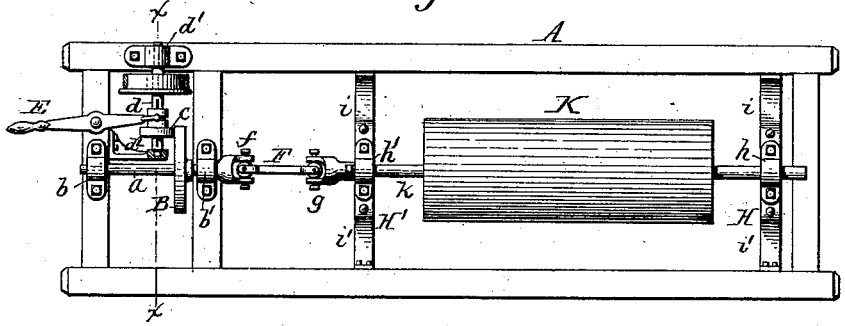
Figure 3:
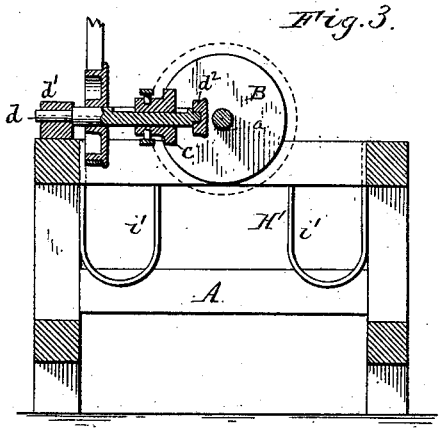
Figure 4:
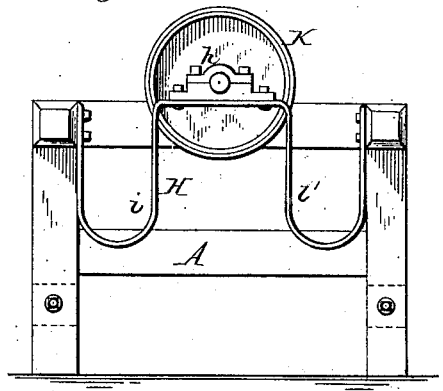

In the accompanying drawings, Figure 1 is a sectional elevation of my improved testing-machine. Fig. 2 is a top plan view thereof. Fig. 3 is a vertical cross-section in line $x\,x$, Fig. 2, on an enlarged scale. Fig. 4 is an elevation of the rear end of the machine on an enlarged scale.

Like letters of reference refer to like parts in the several figures.

A represents the stationary frame of the machine, and $a$ the horizontal main shaft, journaled in stationary bearings $b\,b'$, secured to the front portion of the main frame.

B represents a friction-wheel mounted on the main shaft $a$, and $c$ represents a friction-pinion, which is secured to a horizontal driving-shaft, $d$, arranged at right angles to the main shaft on the front portion of the main frame, and journaled in fixed bearings $d'\,d^2$, secured to said frame. The pinion $c$ moves on a feather on the driving-shaft $d$, and can be thrown in and out of gear with the driving-wheel B by a shifting-lever, E.

F represents a shaft which forms a flexible or movable continuation of the main shaft, and is connected therewith by a universal joint, $f$, which permits the shaft F to assume positions at various angles to the main shaft $a$.

$g$ represents another universal joint secured to the free end of the flexible shaft F, for connecting said shaft with the rotating part to be tested.

$h\,h'$ represent the bearings in which the rotating part K to be tested is journaled.

H H' represent springs or elastic supports, whereby the bearings $h\,h'$ are attached to the main frame A. As shown in the drawings, each of these springs H H' is provided with bent portions $i\,i'$ between the bearings and the side pieces of the frame, to which the ends of the spring are secured. The rotating part K to be tested is provided with a shaft, $k$, which is placed in the bearings $h\,h'$, and connected at its front end to the universal joint $g$, which latter is provided with a suitable socket, in which the shaft $k$ is clamped by a set-screw or other suitable means.

The rotating part K (shown in the drawings) is the drum of a grain-scourer, and is supported in both bearings $h\,h'$; but when a short rotating part is tested—for instance, a pulley or the like—the single bearing $h'$, near the flexible shaft, will be sufficient to support the part.

When the part to be tested has been properly supported in the bearings and connected with the flexible shaft F, the main shaft is rotated from the driving-shaft, and this rotative motion is transmitted to said part by the flexible shaft. If the part is out of balance, the bearings $h\,h'$ will move out of line to a greater or less extent, thereby indicating to what extent the part is out of balance. By stopping the machine from time to time, and adding weights, in the form of screws or otherwise, in the proper places to the part which is being tested, said part can be nicely balanced, which fact is indicated by the part running true in the movable bearings.

I claim as my invention—

1. In a testing-machine, the combination, with the driving-gear, whereby a rotative motion is imparted to the part which is being tested, of a bearing in which said part is journaled and a yielding support to which the bearing is attached, and which permits the bearing to move out of line when the part under treatment is unbalanced, substantially as set forth.

2. In a testing-machine, the combination, with a rotating main shaft journaled in fixed bearings, of a movable shaft connecting the main shaft with the part to be tested and a bearing in which the part to be tested is journaled, and which is attached to a movable support which permits the bearing to move out of line, substantially as set forth.

3. The combination, with the main shaft $a$ and the movable shaft F, of a universal joint, $f$, connecting said shafts, a universal joint, $g$, attached to the free end of the movable shaft F, for attachment to the part to be tested, and a movable bearing, $h$, provided with a yielding support, substantially as set forth.

4. The combination, with the stationary frame A, the main shaft $a$, and the movable shaft F, connected therewith, of a universal joint, $f$, connecting said shafts, a universal joint, $g$, attached to the free end of the movable shaft F, bearings $h\, h'$, and springs H H', connecting said bearings with the stationary frame, substantially as set forth.

Witness my hand this 25th day of October, 1886.

W. W. HUNTLEY.

Witnesses:
F. L. CRANSON,
C. G. HAMMOND.